US012771440B2

(12) United States Patent
Earle

(10) Patent No.: US 12,771,440 B2
(45) Date of Patent: Oct. 20, 2026

(54) DATA TRANSFER MANAGEMENT

(71) Applicant: BAE SYSTEMS plc, London (GB)

(72) Inventor: Michael Austin Gary Earle, Somerset (GB)

(73) Assignee: BAE SYSTEMS PLC, London (GB)

( * ) Notice: Subject to any disclaimer, the term of this patent is extended or adjusted under 35 U.S.C. 154(b) by 35 days.

(21) Appl. No.: 18/864,264

(22) PCT Filed: May 5, 2023

(86) PCT No.: PCT/GB2023/051203
§ 371 (c)(1),
(2) Date: Nov. 8, 2024

(87) PCT Pub. No.: WO2023/218174
PCT Pub. Date: Nov. 16, 2023

(65) Prior Publication Data

US 2025/0341996 A1 Nov. 6, 2025

(30) Foreign Application Priority Data

May 9, 2022 (EP) .................................... 22172357
May 9, 2022 (GB) ..................................... 2206746

(51) Int. Cl.
*H04L 43/045* (2022.01)
*H04L 43/02* (2022.01)
*H04L 43/0894* (2022.01)

(52) U.S. Cl.
CPC ............ *H04L 43/045* (2013.01); *H04L 43/02* (2013.01); *H04L 43/0894* (2013.01)

(58) Field of Classification Search
None
See application file for complete search history.

(56) References Cited

U.S. PATENT DOCUMENTS 7,240,099 B2 * 7/2007 Miyazaki ................ H04L 67/06 709/213
8,112,533 B2 * 2/2012 Furukawa ............... H04L 67/06 709/224

(Continued)

FOREIGN PATENT DOCUMENTS

WO 2007/000175 A1 1/2007

OTHER PUBLICATIONS

International Search Report and Written Opinion dated Aug. 8, 2023 issued in PCT/GB2023/051203.

(Continued)

*Primary Examiner* — Backhean Tiv
(74) *Attorney, Agent, or Firm* — Scully, Scott, Murphy & Presser, P.C.

(57) ABSTRACT

A data transfer evaluation system and method for data transfer management are disclosed. For a data transfer request, bandwidth availability between communication nodes, during a period that incorporates a target commencement time for the requested data transfer, and transmittal data comprising a target transfer rate and a duration for an amount of data to be transferred at the target transfer rate are used to generate image data for a display unit to output an evaluation display that provides a visual indication as to whether the data transfer request is viable and that presents at least one graphical control element usable to modify the data transfer request to generate an updated evaluation display.

19 Claims, 4 Drawing Sheets

(56) References Cited

U.S. PATENT DOCUMENTS

| | | | | |
|---|---|---|---|---|
| 8,340,099 | B2 * | 12/2012 | Black | H04L 43/0888 370/395.2 |
| 8,954,532 | B2 * | 2/2015 | Tanaka | H04L 69/16 370/230 |
| 9,325,597 | B1 * | 4/2016 | Clasen | H04L 47/762 |
| 9,509,559 | B2 * | 11/2016 | Shimizu | H04W 52/0225 |
| 9,794,125 | B2 * | 10/2017 | Speks | H04W 4/18 |
| 10,659,991 | B2 * | 5/2020 | Pedersen | G05D 1/0038 |
| 11,050,675 | B2 * | 6/2021 | Holm | H04L 47/805 |
| 2004/0153567 | A1 * | 8/2004 | Lichtenstein | H04L 47/50 709/219 |
| 2005/0188089 | A1 * | 8/2005 | Lichtenstein | H04L 47/15 709/226 |
| 2007/0161411 | A1 * | 7/2007 | Liao | H04W 28/20 455/566 |
| 2011/0188498 | A1 * | 8/2011 | Inagaki | H04L 47/365 370/389 |
| 2013/0014186 | A1 * | 1/2013 | Thomas | H04N 21/4753 725/87 |
| 2013/0055136 | A1 * | 2/2013 | Aaron | H04L 12/1485 715/772 |
| 2018/0097740 | A1 * | 4/2018 | Reddy | H04W 28/26 |
| 2019/0007127 | A1 * | 1/2019 | Ward | H04L 43/0817 |
| 2025/0341996 | A1 * | 11/2025 | Earle | H04B 7/18519 |

OTHER PUBLICATIONS

Extended European Search Report dated Oct. 21, 2022 issued in EP 22172357.0.

GB Search Report dated Oct. 13, 2022 issued in GB 2206746.6.

* cited by examiner

DATA TRANSFER MANAGEMENT

FIELD

The present invention relates to data transfer management, and more particularly to evaluating data transfer viability.

BACKGROUND

In many scenarios it is desirable to transfer data between communication nodes, at a specified time. A communication node may be a fixed or a movable node and may be for example: a ground station, a ground vehicle, a watercraft, an aircraft, an unmanned aerial vehicle (UAV), or a satellite. Data to be transferred may be in one of different formats developed for messages, images, audio and/or video. For example, it may be desired for an image obtained using a UAV to be transmitted to a ground station, either directly or via another UAV. A time for a data transfer to take place may be scheduled based on various parameters, for example relating to a proximity of one communication node to another and a communication connection usable for the data transmission, with which bandwidth availability and data transfer rate are associated. It would be advantageous for an operator scheduling transfers of data between communication nodes to be provided with an evaluation of the viability of a planned data transfer.

SUMMARY

According to an aspect of the present invention, there is provided a data transfer evaluation system for data transfer management, comprising: an input module configured to: generate a data transfer request, the data transfer request comprising data indicating: a request for data to be transferred from a source node to a destination node; a target communications connection for the data transfer; a target transfer rate for the data transfer; and a target commencement time for the data transfer; and determine, for the target communications connection, bandwidth availability, between the source node and the destination node during a period that incorporates the target commencement time; and an evaluation module configured to: generate, from the generated data transfer request and determined bandwidth availability, image data for a display unit to output an evaluation display comprising: a graphical representation of the determined bandwidth availability; and a visual representation of transmittal data, the transmittal data comprising the target transfer rate and a duration for an amount of data to be transferred at the target transfer rate; the visual representation of transmittal data presented at a region of superimposition with the graphical representation of the determined bandwidth availability, based on the target commencement time, the region of superimposition providing a visual indication as to whether the data transfer request is viable.

The input module may further be configured to identify an input comprising a request to modify the target commencement time to a modified target commencement time and, in response, generate a data transfer request comprising data indicating the modified target commencement time as the target commencement time.

The evaluation module may further be configured to generate image data for the evaluation display to present a graphical control element usable to input, to the input module, a request to modify the target commencement time to a modified target commencement time.

The graphical control element may be a portion of the visual representation of transmittal data.

The input module may further be configured to identify an input comprising a request to modify the target transfer rate to a modified target transfer rate and, in response, generate a data transfer request comprising data indicating the modified target transfer rate as the target transfer rate.

The evaluation module may further be configured to generate image data for the evaluation display to present a graphical control element usable to input, to the input module, a request to modify the target transfer rate to a modified target transfer rate.

The graphical control element may be a portion of the visual representation of transmittal data.

The input module may be further configured to identify an input comprising a request to modify the target communications connection to a modified target communications connection and, in response, determine for the modified target communications connection, bandwidth availability, between the source node and the destination node during a period that incorporates the target commencement time.

An input comprising a request to modify the target transfer rate to a modified target transfer rate may be identified from a request to modify the target communications connection to a modified target communications connection.

The source node may be one of: a ground station, a ground vehicle, a watercraft, an aircraft, an unmanned aerial vehicle (UAV), or a satellite.

The destination node may be one of: a ground station, a ground vehicle, a watercraft, an aircraft, an unmanned aerial vehicle (UAV), or a satellite.

The target communications connection may be a radio communication connection.

The target commencement time may be an operator-specified value indicating a date and time.

The data transfer evaluation system may further comprise a display unit for outputting an evaluation display from image data generated by the evaluation module.

The data transfer evaluation system may further comprise at least one input device for inputting operator-specified selections to the input module.

According to a second aspect there is provided a method for data transfer management, comprising: identifying a data transfer request, the data transfer request comprising data indicating: a request for data to be transferred from a source node to a destination node; a target communications connection for the data transfer; a target transfer rate for the data transfer; and a target commencement time for the data transfer; determining, for the target communications connection, bandwidth availability, between the source node and the destination node during a period that incorporates the target commencement time; generating, from the identified data transfer request and determined bandwidth availability, image data for a display unit to output an evaluation display comprising: a graphical representation of the determined bandwidth availability; and a visual representation of transmittal data, the transmittal data comprising the target transfer rate and a duration for an amount of data to be transferred at the target transfer rate; the visual representation of transmittal data presented at a region of superimposition with the graphical representation of the determined bandwidth availability, based on the target commencement time, the region of superimposition providing a visual indication as to whether the data transfer request is viable, and outputting the evaluation display on a display unit using the generated image data.

The source node may be one of: a ground station, a ground vehicle, a watercraft, an aircraft, an unmanned aerial vehicle (UAV), or a satellite.

The destination node may be one of: a ground station, a ground vehicle, a watercraft, an aircraft, an unmanned aerial vehicle (UAV), or a satellite.

The target communications connection may be a radio communication connection.

The method may further comprise: identifying a modified data transfer request comprising a modification to the target commencement time of the data transfer request; generating, from the modified data transfer request and determined bandwidth availability, revised image data; and outputting an updated evaluation display on a display unit using the generated revised image data.

The method may further comprise: identifying a modified data transfer request comprising a modification to the target communications connection of the data transfer request; determining, for the target communications connection of the modified data transfer request, bandwidth availability, between the source node and the destination node during a period that incorporates the target commencement time; generating, from the modified data transfer request and determined bandwidth availability, revised image data; and outputting an updated evaluation display on a display unit using the generated revised image data.

Further aspects disclosed herein may be incorporated in the appended claims.

BRIEF DESCRIPTION OF THE FIGURES

Embodiments of the invention will now be described by way of example only with reference to the figures, in which.

DETAILED DESCRIPTION

Figure 1:
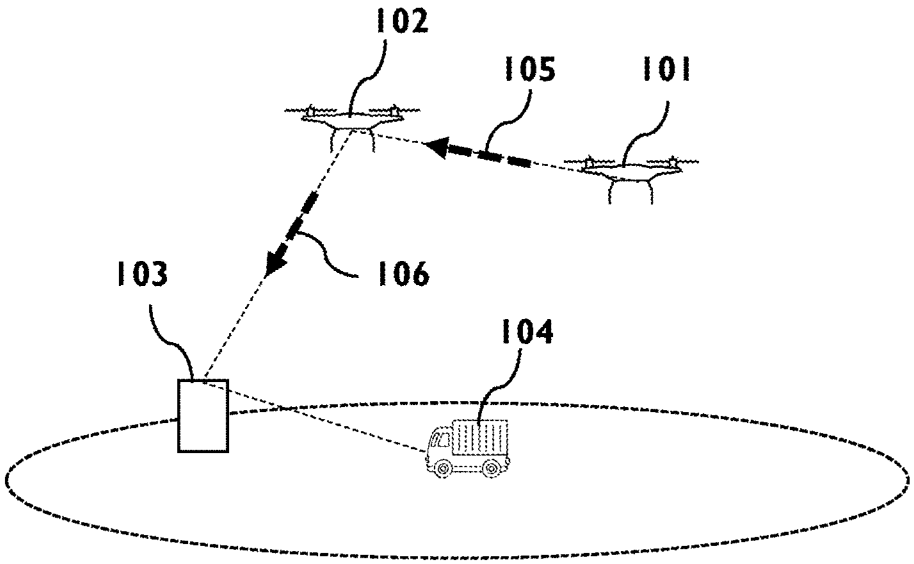
FIG. 1 is a diagram illustrating communication nodes between which data transfers are to be scheduled.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. All modifications, equivalents, and alternatives falling within the scope of the appended claims should be considered included by the scope of the disclosure. Elements of the example embodiments are consistently denoted by the same reference numerals throughout the drawings and detailed description where appropriate.

The terminology used herein to describe embodiments is not intended to limit the scope to only embodiments described. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms 30 "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

A data transfer evaluation system and method for data transfer management are disclosed. For a data transfer request, bandwidth availability between communication nodes during a period that incorporates a target commencement time for the requested data transfer, and transmittal data comprising a target transfer rate and a duration for an amount of data to be transferred at the target transfer rate are used to generate image data for a display unit to output an evaluation display that provides a visual indication as to whether the data transfer request is viable and that presents at least one graphical control element usable to modify the data transfer request to generate an updated evaluation display.

According to an example there is provided a data transfer evaluation system for data transfer management, comprising: an input module configured to: generate a data transfer request, the data transfer request comprising data indicating: a request for data to be transferred from a source node to a destination node; a target communications connection for the data transfer; a target transfer rate for the data transfer; and a target commencement time for the data transfer; and determine, for the target communications connection, bandwidth availability, between the source node and the destination node during a period that incorporates the target commencement time; and an evaluation module configured to: generate, from the generated data transfer request and determined bandwidth availability, image data for a display unit to output an evaluation display comprising: a graphical representation of the determined bandwidth availability; and a visual representation of transmittal data, the transmittal data comprising the target transfer rate and a duration for an amount of data to be transferred at the target transfer rate; the visual representation of transmittal data presented at a region of superimposition with the graphical representation of the determined bandwidth availability, based on the target commencement time, the region of superimposition providing a visual indication as to whether the data transfer request is viable.

According to an example there is provided a method for data transfer management, comprising: identifying a data transfer request, the data transfer request comprising data indicating: a request for data to be transferred from a source node to a destination node; a target communications connection for the data transfer; a target transfer rate for the data transfer; and a target commencement time for the data transfer; determining, for the target communications connection, bandwidth availability, between the source node and the destination node during a period that incorporates the target commencement time; generating, from the identified data transfer request and determined bandwidth availability, image data for a display unit to output an evaluation display comprising: a graphical representation of the determined bandwidth availability; and a visual representation of transmittal data, the transmittal data comprising the target transfer rate and a duration for an amount of data to be transferred at the target transfer rate; the visual representation of transmittal data presented at a region of superimposition with the graphical representation of the determined bandwidth availability, based on the target commencement time, the region of superimposition providing a visual indication as to whether the data transfer request is viable, and outputting the evaluation display on a display unit using the generated image data.

In at least one example, revised image data is generated in response to identification of a modification to the target commencement time.

In at least one example, revised image data is generated in response to identification of a modification to the target transfer rate.

In at least one example, revised image data is generated in response to identification of a modification to the target communications connection.

In at least one example, image data is generated for the evaluation display to present a graphical control element usable to input a modification to the target commencement time.

In at least one example, image data is generated for the evaluation display to present a graphical control element usable to input a modification to the target transfer rate.

In at least one example, the source node is one of: a ground station, a ground vehicle, a watercraft, an aircraft, an unmanned aerial vehicle (UAV), or a satellite.

In at least one example, the destination node is one of: a ground station, a ground vehicle, a watercraft, an aircraft, an unmanned aerial vehicle (UAV), or a satellite.

In at least one example, the target communications connection is a radio communication connection.

FIG. 1 is a diagram illustrating communication nodes between which data transfers are be scheduled.

A communication node may be a fixed, moving, or stationary node, and may be, for example, a ground station, a ground vehicle, a watercraft, an aircraft, an unmanned aerial vehicle (UAV), or a satellite.

Communication nodes 101 and 102 are each an unmanned aerial vehicle (UAV) and communication node 103 is a ground station. Communication node 104 is a ground vehicle.

Data to be transferred from a source communication node to a destination communication node may be in any format, such as a format developed for alphanumeric information, images, animations, audio and/or video.

In an example, an image obtained using UAV 101 is to be transmitted to ground station 103, via UAV 102. The data transmission thus involves a first transfer of data, indicated by arrow 105, from UAV 101 to UAV 102, followed by a second transfer of data, indicated by arrow 106, from UAV 102 to ground station 103. Clearly, for the data transmission to be effective, the first transfer of data must have completed before the second transfer of data can be completed. Data transfer management is therefore required to ensure that an intended data transfer can be properly effected.

A time for a data transfer to take place may be scheduled based on various parameters, for example relating to a proximity of one communication node to another and a communication connection usable for the data transmission. The actual time for a data transfer to be completed can be affected by various aspects, such as atmospheric and environmental conditions between communication nodes.

Figure 2:
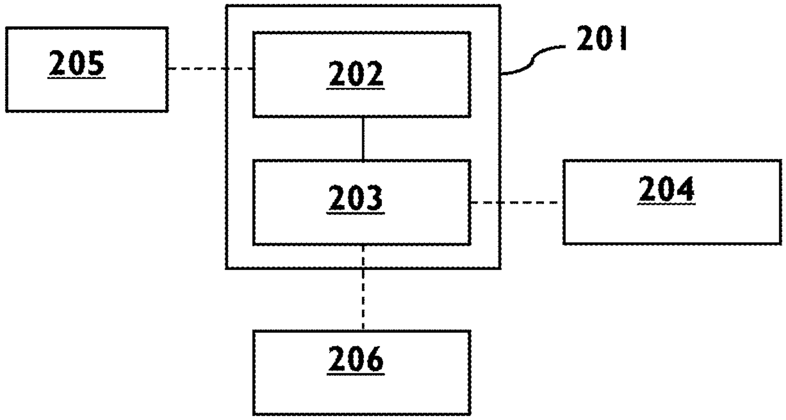
FIG. 2 is a schematic representation of a data transfer evaluation system for data transfer management.

A schematic representation of a data transfer evaluation system for data transfer management is shown in FIG. 2.

Data transfer evaluation system 201 comprises at least an input module 202 and an evaluation module 203.

The input module 202 is configured to generate a data transfer request comprising at least the data described hereafter.

The data transfer request comprises data indicating a request for data to be transferred from a source node to a destination node. This can identify a specific communication node as the source node, a specific communication node as the destination node, a specific type of data and a specific amount of data to be transferred during a data transmittal.

The data transfer request comprises data indicating a target communications connection for the data transfer. This can identify a specific communication connection, for example distinguished by radio frequency band, that is usable for transmitting data from the source node to the destination node and is suitable for the type of data to be transferred.

The data transfer request comprises data indicating a target transfer rate for the data transfer. This can identify a specific transfer rate achievable using the target communications connection to transmit the type of data to be transferred.

The data transfer request comprises data indicating a target commencement time for the data transfer. This can identify an actual date and time for the data transfer to commence.

The data transfer request can also comprise data indicating a projected data transfer duration, derived from a transfer rate for the type of data to be transferred and an amount of that type of data to be transferred.

The input module 202 is configured to determine, for the target communications connection, bandwidth availability, between the source node and the destination node during a period that incorporates the target commencement time.

The period during which the bandwidth availability is determined may start at, or earlier than the target commencement time, and may end at a pre-determined duration after the target commencement time or, if a projected data transfer duration is indicated, at a pre-determined duration after the end of the projected data transfer duration.

The evaluation module 203 is configured to generate, from the generated data transfer request and the determined bandwidth availability, image data for a display unit to output an evaluation display. The evaluation display comprises at least a graphical representation of the determined bandwidth availability and a visual representation of transmittal data, the transmittal data comprising the target transfer rate and a duration for an amount of data to be transferred at the target transfer rate, the visual representation of transmittal data presented at a region of superimposition with the graphical representation of the determined bandwidth availability, based on the target commencement time, the region of superimposition providing a visual indication as to whether the data transfer request is viable.

The input module 202 and evaluation module 203 may each comprise any suitable data processing arrangement. Data from which the input module 202 is configured to generate the data transfer request may be retrieved, obtained, derived, or supplied from any one or more memory source and/or input device accessible by or connected to the input module 202. Data from which the evaluation module 203 is configured to generate the image data may be received directly from the input module 202.

The data transfer evaluation system 201 preferably further comprises a display unit 204 for outputting an evaluation display using the generated image data. The display unit 204 may be any suitable output device comprising a display screen.

The data transfer evaluation system 201 preferably further comprises at least one user input device 205 for allowing a user to at least input a request to modify data from which the input module 202 has generated a data transfer request. The user input device 205 may be any suitable device, for example: a mouse, a trackpad, a joystick, or a keyboard.

The data transfer evaluation system 201 may further comprise, or be interfaced with, a validation module 206.

Figure 3:
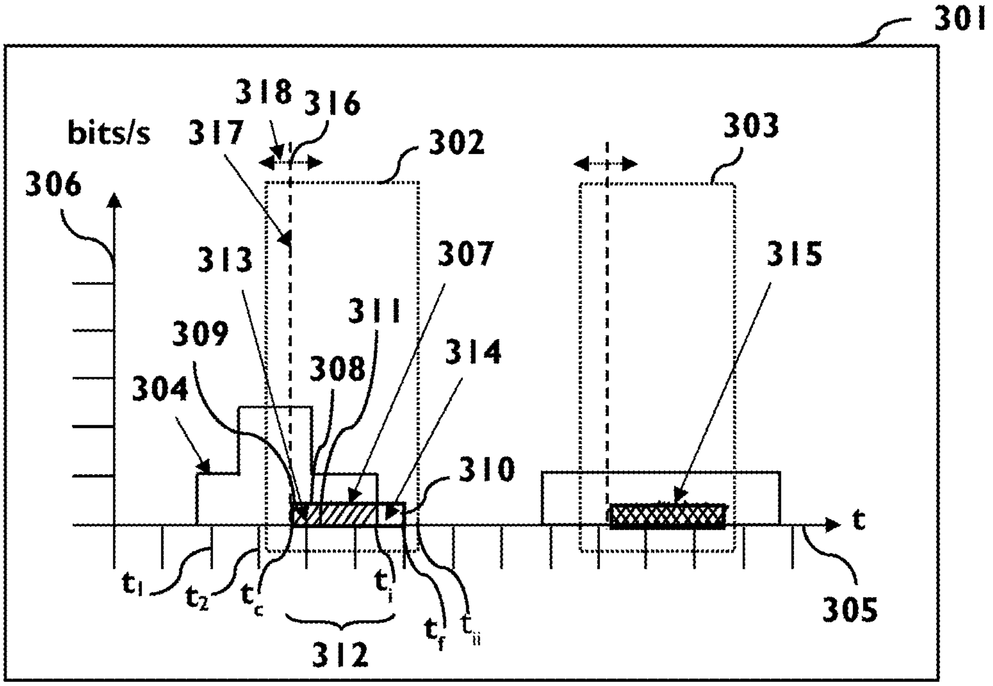
FIG. 3 shows features of an evaluation display for a data transfer request.

An evaluation display 301 for a data transfer request is illustrated in FIG. 3.

To facilitate explanation of the evaluation display, reference is made also to FIG. 1; the indicated area 302 of the evaluation display 301 corresponds to the transfer of data 105 from UAV 101 to UAV 102 and the indicated area 303 of the evaluation display 301 corresponds to the subsequent transfer of data 106 from UAV 102 to ground station 103 to complete the desired data transmission from UAV 101 to ground station 103.

The evaluation display 301 shows a graphical representation 304 of the determined bandwidth availability, with reference to an X-axis 305 indicating time, t, and a Y-axis 306, indicating bandwidth availability, bits/s. The graphical representation 304 of the determined bandwidth availability indicates the maximum available bandwidth over time for the target communication connection between the source node and the destination node. For example, the maximum available bandwidth at time $t_2$ is illustrated to be greater than the maximum available bandwidth at time $t_1$.

The evaluation display 301 further shows a visual representation 307 of transmittal data, the transmittal data comprising a target transfer rate and a duration for an amount of data to be transferred at the target transfer rate. In this illustrated example the visual representation 307 of transmittal data is of a rectangular shape, of which an upper side 308, left side 309, right side 310 and lower side 311 of the outline of the rectangular shape are indicated. In this Figure, the lower side 311 is coincident with the X-axis 305 and may or may not be readily visually distinguishable from the X-axis 305 (in a preferred example, colour and/or line thickness is used to highlight a region of the X-axis 305 that the lower side 311 of the rectangular shape coincides with).

The rectangular shape of the visual representation 307 of transmittal data conveys information as follows. The position of the upper side 308 along the Y-axis 306 indicates the target transfer rate. The position of the left side 309 along the X-axis 305 indicates the target commencement time, $t_c$, and the distance 312 between the left side 309 and the right side 310 along the X-axis 305 indicates the duration for an amount of data to be transferred at the target transfer rate. The position of the right side 310 along the X-axis 305 thus indicates a projected finish time, $t_f$.

As illustrated, the visual representation 307 of transmittal data is presented at a region of superimposition (within area 302) with the graphical representation 304 of the determined bandwidth availability, based on the target commencement time, $t_c$, with the region of superimposition providing a visual indication as to whether the data transfer request is viable.

Looking at the area 302 of the evaluation display 301, at the target commencement time, $t_c$, there is sufficient bandwidth availability for the requested data transfer but at the projected finish time, $t_f$, there is zero bandwidth availability; thus, during the indicated duration for an amount of data to be transferred at the target transfer rate, there is a loss of bandwidth availability to the effect that the data transfer request is not viable.

In this illustrated example, the visual indication as to whether the data transfer request is viable is made more easily interpretable by the use within the visual representation of transmittal data of (i) first visual characteristics to indicate an initial phase of the requested transfer of data that is possible and (ii) second, different visual characteristics to indicate a subsequent phase of the requested transfer of data that is not possible. The visual characteristics of each of the first and second, different visual characteristics may comprise one or more of: colour, and pattern.

More specifically, looking again at the area 302 of the evaluation display 301, there is insufficient bandwidth availability for the requested data transfer from the time $t_i$ (before the projected finish time $t_f$) until at least the time $t_{ii}$ (after the projected finish time $t_f$). A first zone 313 of the rectangular shape of the visual representation 307, between the target commencement time $t_c$ and the time $t_i$ during which the requested transfer of data is possible, is defined using first visual characteristics, which in this specific illustrated example is provided by a pattern formed using slanting lines, and a second zone 314 of the rectangular shape of the visual representation 307, between the target time $t_i$ and the projected finish time $t_f$ during which the requested transfer of data is not possible, is defined using second, different visual characteristics, which in this specific example is provided by the absence of a pattern.

The evaluation display 301 enables an operator to determine quickly, by a basic visual inspection of the region in which the visual representation 307 of transmittal data is superimposed on the graphical representation 304 of the determined bandwidth availability, whether the data transfer request is viable. In the present example, for the transfer of data 105, a simple visual identification of the rectangular shape of the visual representation 307 of the transmittal data having two zones of differing appearances is enough to convey an issue with the viability of the data transfer request.

Looking now at the area 303 of the evaluation display 301, it can readily be determined that there is sufficient bandwidth availability for the second transfer of data 106 from UAV 102 to ground station 103, which would complete the desired data transmission from UAV 101 to ground station 103; however, as the second transfer of data 106 is dependent upon completion of the first transfer of data 105 and an evaluation of viability of the first transfer of data 105 has indicated that the first transfer of data 105 is not viable, it follows that the second transfer of data 106 is not possible. This is indicated in this illustrated example by the use of third, different visual characteristics, which in this specific example is provided by a pattern formed from cross hatched lines.

The more contrasting the visual characteristics used to convey different evaluations (the requested data transfer is viable, the requested data transfer is not viable (for whatever reason), the requested data transfer is not viable (for a reason also being indicated, for example a lack of bandwidth availability or non-viability of another data transfer on which the requested data transfer is dependent)), the more readily visually distinguishable each indication as to whether the data transfer request is viable may be from another indication.

Thus, in use, the data transfer evaluation system 201 provides an indication as to whether a requested data transfer is viable.

Another function of the data transfer evaluation system 201 will now be described with reference to FIGS. 3 and 4.

The input module 202 is further configured to identify an input comprising a request to modify the target commencement time $t_c$ to a modified target commencement time $t_{c'}$. In response, the input module 202 can generate a data transfer request comprising data indicating the modified target commencement time $t_{c'}$ as the target commencement time. The modification to the data transfer request can then be reflected in the image data generated by the evaluation module 203, which in turn can be reflected in an update to the evaluation display 301.

One or more different options for providing an input to request to modify the target commencement time to a modified target commencement time may be provided. For example, a menu item may be accessible allowing the target commencement time to be changed by an operator to enter a value by selecting from one or more values presented in a drop-down list or by typing or otherwise inputting a value into a field.

Alternatively, or additionally, the evaluation module 203 is further configured to generate image data for the evaluation display 301 to present a graphical control element usable to input to the input module a request to modify the target commencement time to a modified target commencement time.

Referring now to FIG. 3, graphical control element 316 is indicated that comprises a line element 317 and an arrow element 318. The line element 316 is shown extending substantially perpendicularly to the X-axis 305 and coincident with the left side 309 of the rectangular shape of the visual representation 307 of transmittal data. The arrow element 318 indicates the or each direction along the X-axis 305 that the line element 317 can be moved to drag the rectangular shape of the visual representation 307 of the transmittal data along the X-axis 305. As stated previously, the left side 309 of the rectangular shape of the visual representation 307 of transmittal data is positioned at the target commencement time $t_c$ of the data transfer request generated by the input module 202. Moving the line element 317 to reposition the rectangular shape of the visual representation 307 of the transmittal data along the X-axis 305 moves the left side 309 of the rectangular shape to a different time, this action correlating to changing the target commencement time $t_c$ to a modified target commencement time $t_{c'}$.

For example, it is evident from the area 302 of the evaluation display 301 corresponding to the first transfer of data 105 that modifying the target commencement time $t_c$ to an earlier time could result in the data transfer request being re-evaluated as viable, in turn also rendering the second transfer of data 106, to which the area 303 of evaluation display 301 corresponds, viable.

Figure 4:
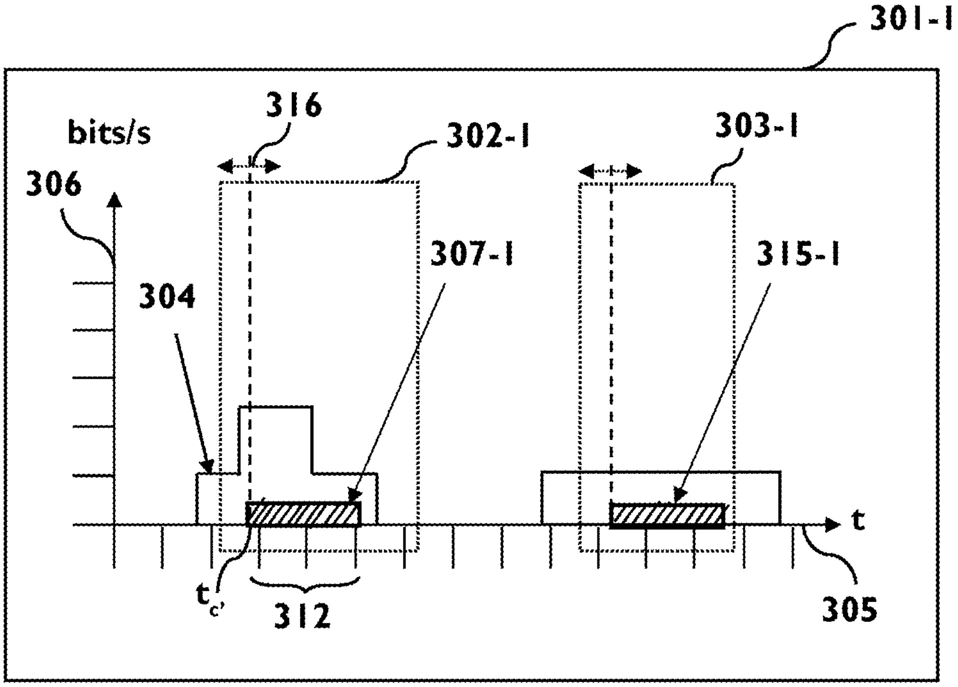
FIG. 4 shows a further feature of an evaluation display for a data transfer request.

FIG. 4 shows updated evaluation display 301-1 after the target commencement time $t_c$ of the evaluation display 301 of FIG. 3 has been modified to an earlier target commencement time $t_{c'}$.

Area 302 of the evaluation display 301 of FIG. 3 has been updated following the modification to the target commencement time $t_c$ for the first transfer of data 105 and is shown as area 302-1 of the evaluation display 301-1 of FIG. 4. There has been no change to the graphical representation 304 of the determined bandwidth availability, and there has been no change to the outline of the rectangular shape of the visual representation 307 of transmittal data (the distance 312 indicating the duration for an amount of data to be transferred at the target transfer rate is unchanged); however, there has been a change in the superimposition of the visual representation 307 of transmittal data with the graphical representation 304 of the determined bandwidth availability, as this is based on the target commencement time (which has been modified). There is still provided a visual indication as to whether the data transfer request is viable, but in the updated area 302-1 of the evaluation display 301-1, the data transfer request is now indicated to be viable. Further, the area 303 of the evaluation display 301 of FIG. 3 has been updated following the modification to the target commencement time $t_c$ for the first transfer of data 105, shown as area 303-1 of the evaluation display 301-1 of FIG. 4, with this indicating that the second transfer of data 106 is viable too.

Comparing the visual representation 307-1 of transmittal data in area 302-1 of the updated evaluation display 301-1 of FIG. 4 to the visual representation 307 of transmittal data in area 302 of the evaluation display 301 of FIG. 3, it can be seen that in the updated evaluation display 301-1 of FIG. 4, the rectangular shape of the visual representation 307-1 has a uniform appearance throughout, provided using the first visual characteristics used in zone 313 of the rectangular shape of the visual representation 307 in FIG. 3, which indicate when transfer of data for the requested data transfer is possible.

Comparing the visual representation 315-1 of transmittal data in area 303-1 of the updated evaluation display 301-1 of FIG. 4 to the visual representation 315 of transmittal data in area 303 of the evaluation display 301 of FIG. 3, it can be seen that in the updated evaluation display 301-1 of FIG. 4, the rectangular shape of the visual representation 315-1 still has a uniform appearance, but this time provided using the first visual characteristics used in zone 313 of the rectangular shape of the visual representation 307 in FIG. 3, which indicate when transfer of data for the requested data transfer is possible.

Thus, whereas a comparison of the visual representations 307, 315 of transmittal data in areas 302, 303 respectively of the evaluation display 301 of FIG. 3 reveal a difference between the displayed visual characteristics, no such different is noticeable from a comparison of the visual representations 307-1, 315-1 of transmittal data in areas 302-1, 303-1 respectively of the updated evaluation display 301-1 of FIG. 4.

Another function of the data transfer evaluation system 201 will now be described with reference to FIGS. 4 and 5.

The input module 202 is further configured to identify an input comprising a request to modify the target transfer rate to a modified target transfer rate. In response, the input module 202 can generate a data transfer request comprising data indicating the modified target transfer rate as the target transfer rate. The modification to the data transfer rate can then be reflected in the image data generated by the evaluation module 203, which in turn can be reflected in an updated evaluation display 301.

The format of the evaluation display facilitates identification of opportunities for a data transfer to be performed at a different target transfer rate. This may be beneficial for a variety of reasons, including optimising available bandwidth/time for the transfer of other data.

For example, looking at FIG. 4, it is evident from the area 302-1 of the evaluation display 301-1 corresponding to the first transfer of data 105 that at the modified target commencement time $t_{c'}$, there is additional bandwidth available.

Figure 5:
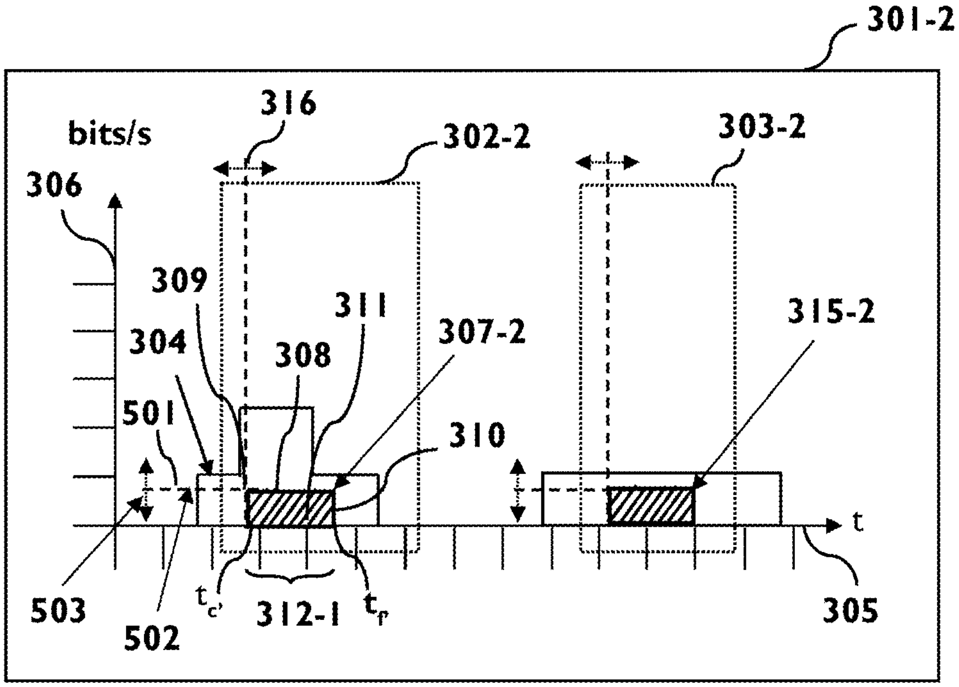
FIG. 5 shows another feature of an evaluation display for a data transfer request.

FIG. 5 shows updated evaluation display 301-2 after the target transfer rate for both the first and second transfers of data 105, 106 has been modified, more specifically, changed to a higher transfer rate; areas 302-1 and 303-1 of the evaluation display 301-1 of FIG. 4 have been updated accordingly and are shown as areas 302-2 and 303-2 in the evaluation display 301-2 of FIG. 5.

Looking at area 302-2 of the updated evaluation display 301-2 of FIG. 5, there has been no change to the graphical representation 304 of the determined bandwidth availability, and the superimposition of the visual representation 307 of transmittal data with the graphical representation 304 of the determined bandwidth availability remains based on the same target commencement time $t_{c'}$; however, the outline of the rectangular shape of the visual representation 307-2 has changed from that of the rectangular shape of the visual representation 307-1 of the evaluation display 301-1 of FIG. 4, with an increased distance between the upper and lower sides 308, 311 (the changed position of the upper side 308 reflecting the increase in the target data transfer rate) and a decreased distance 312-1 between the left and right sides 309, 310 (the changed position of the right side 310 indicating an earlier projected finish time $t_{f'}$).

One or more different options for providing an input to request to modify the target transfer rate to a modified target transfer rate may be provided. For example, a menu item may be accessible allowing the target transfer rate to be changed by an operator to enter a value by selecting from one or more values presented in a drop-down list or by typing or otherwise inputting a value into a field.

Alternatively, or additionally, the evaluation module 203 is further configured to generate image data for the evaluation display 301 to present a graphical control element usable to input to the input module a request to modify the target transfer rate to a modified target transfer rate.

In FIG. 5 a graphical control element 501 is indicated that comprises a line element 502 and an arrow element 503. The line element 501 is shown extending substantially parallel to the X-axis 305 and coincident with the upper side 308 of the rectangular shape of the visual representation 307-2 of transmittal data. The arrow element 503 indicates the or each direction along the Y-axis 306 that the line element 502 can be moved to drag the upper side 308 of the outline of the rectangular shape of the visual representation 307-2 of the transmittal data along the Y-axis 306. As stated previously, the upper side 308 of the rectangular shape of the visual representation 307-2 of transmittal data indicates the target transfer rate of the data transfer request generated by the input module 202. Moving the line element 502 to reposition the upper side 308 of the rectangular shape of the visual representation 307-2 along the Y-axis 306 correlating to changing the target transfer rate to a modified target transfer rate. It also changes the position of the right side 310 of the rectangular shape of the visual representation 307-2, as transferring an amount of data at a different rate changes the duration of the data transfer.

In a different example, the graphical control element 501 is the upper side 308 of the outline of the rectangular shape of the visual representation 307-2. Hence, the graphical control element is a portion of the visual representation of transmittal data.

The input module 202 is preferably further configured to identify an input comprising a request to modify the target communications connection to a modified target communications connection. In response, the input module 202 can determine, for the modified target communications connection, bandwidth availability, between the source node and the destination node during a period that incorporates the target commencement time. The bandwidth availability determined for the modified target communications connection, can be reflected in an updated evaluation display.

One or more different options for providing an input to request to modify the target communications connection to a modified target communications connection may be provided. For example, a menu item may be accessible allowing the target communications connection to be changed by an operator selecting an option from one or more options presented in a drop-down list.

An input comprising a request to modify the target transfer rate to a modified target transfer rate may be identified from a request to modify the target communications connection to a modified target communications connection. For example, an operator may select a different target communications connection that cannot support the target transfer rate used in the previous data transfer evaluation, and the target transfer rate may then be modified automatically in response, or an indication of non-viability (based on parameter incompatibility) may be output.

Figure 6:
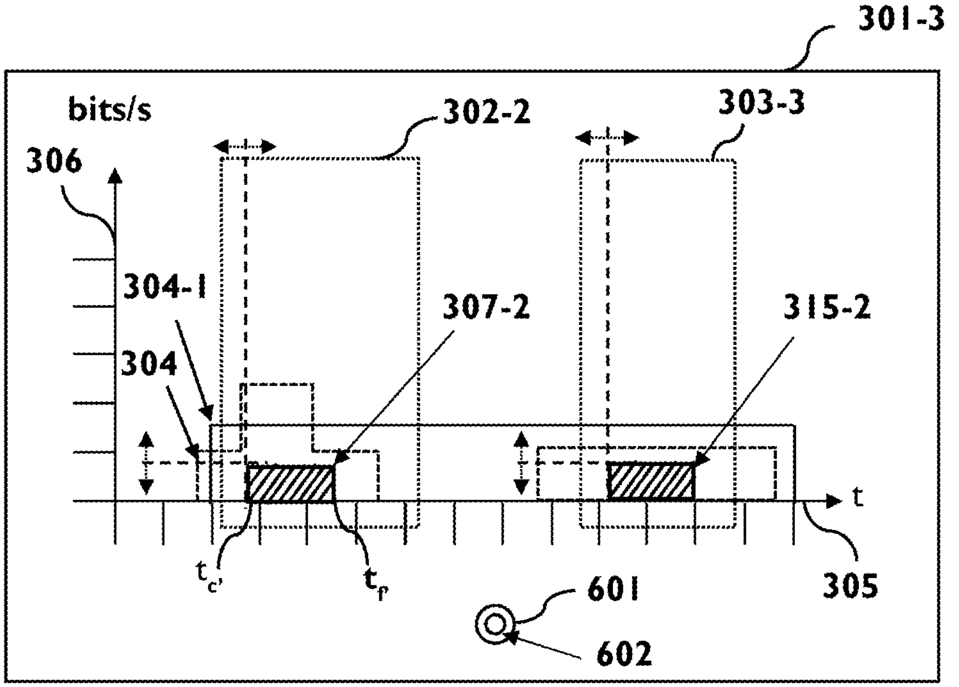
FIG. 6 shows yet another feature of an evaluation display for a data transfer request.

FIG. 6 shows updated evaluation display 301-3 after the target communications connection for both the first and second transfers of data 105, 106 has been modified, with an updated graphical representation 304-1 of the determined bandwidth availability.

Areas 302-2 and 303-2 of the evaluation display 301-2 of FIG. 5 are shown as areas 302-3 and 303-3 in the evaluation display 301-3 of FIG. 6, and visual representations 307-2 and 315-2 of FIG. 5 are shown also in FIG. 6 without any change to the respective target transfer rate and duration for the data to be transferred using that target transfer rate and without any change to the indicated viability.

An optional feature of the data transfer evaluation system 201 is illustrated in FIG. 6, of the evaluation module 203 being further configured to generate image data for the evaluation display to present a graphical control element usable to input, to the input module, a request to show the prior evaluation display.

In this Figure, a graphical control element 601 is indicated that comprises a button element 602 that an operator can use to reveal or highlight the prior evaluation display, overlaid in a visually distinctive manner on the present evaluation display. This can enable an operator to see the difference made by the modification, so it can be assessed. Thus, in this specific illustrated example, an operator is provided with the ability to see the previous graphical representation 304 of the determined bandwidth availability (for the previous target communications connection) for comparison with the present graphical representation 304-1 of the determined bandwidth availability (for the modified target communications connection).

A data transfer request that has been evaluated to be viable may then be validated by a validation module, such as validation module 206, to enter the data transfer request into a planner from which the requested data transfer can be effected.

Figure 7:
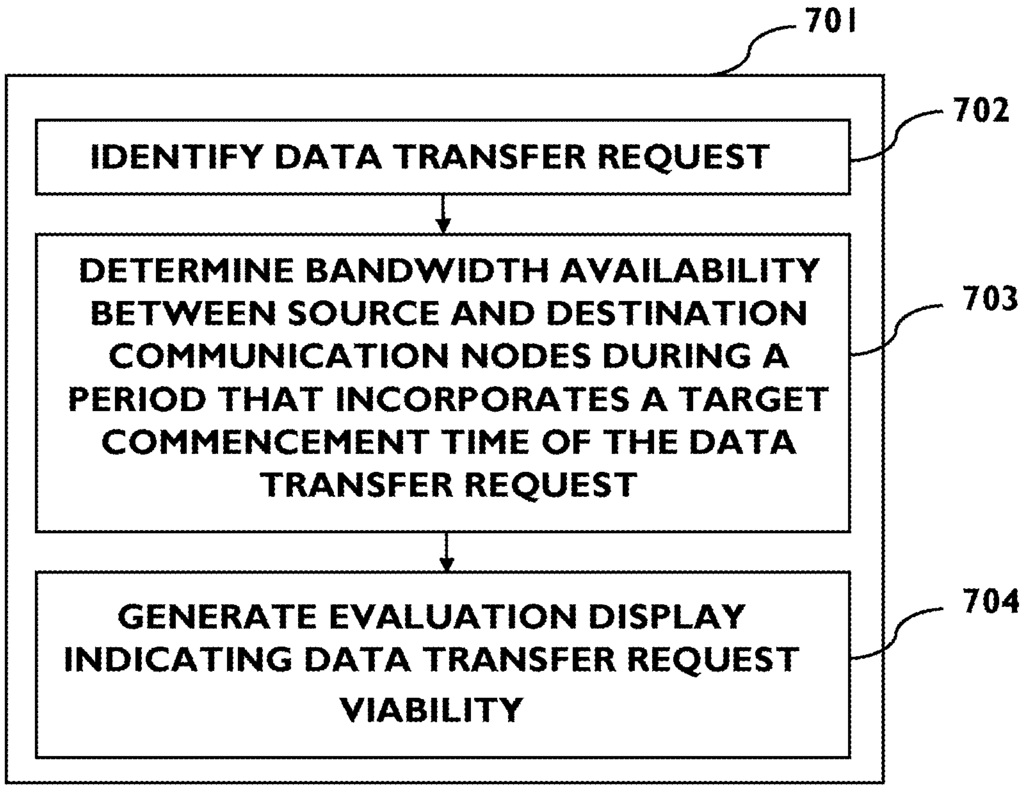
FIG. 7 shows steps in a method of data transfer management.

Steps in a method 701 for data transfer management are shown in FIG. 7.

At step 702, a data transfer request is identified. The data transfer request comprises data indicating: a request for data to be transferred from a source node to a destination node; a target communications connection for the data transfer; a target transfer rate for the data transfer; and a target commencement time for the data transfer. Each of the communication nodes may be a fixed, moving, or stationary node, and may be, for example, a ground station, a ground vehicle, a watercraft, an aircraft, an unmanned aerial vehicle (UAV), or a satellite. Data to be transferred from a source communication node to a destination communication node may be in any format, such as a format developed for alphanumeric information, images, animations, audio and/or video. The target communications connection may be any suitable communications connection and may be a radio communications connection. The target transfer rate may be derived from the target communications connection. The target commencement time may be dependent on when an earlier data transfer and/or a later data transfer is to be effected.

At step 703, bandwidth availability between the source node and the destination node during a period that incorporates the target commencement time; is determined.

At step 704, an evaluation display indicating data transfer viability is generated. Using the data transfer request identified at step 702 and the bandwidth availability determined at step 703, image data for a display unit to output an evaluation display is generated and provided to a display unit that outputs the evaluation display. The evaluation display presents a visual representation of transmittal data, the transmittal data comprising the target transfer rate and a duration for an amount of data to be transferred at the target transfer rate presented, at a region of superimposition with a graphical representation of the determined bandwidth availability, based on the target commencement time, to provide a visual indication as to whether the data transfer request is viable.

The method may comprise any further suitable steps. Preferably, the method comprises identifying a modification to the data transfer request and generating an updated evaluation display in response.

The method may comprise identifying a modified data transfer request comprising a modification to the target commencement time of the data transfer request, generating, from the modified data transfer request and determined bandwidth availability, revised image data; and outputting an updated evaluation display on a display unit using the generated revised image data.

The method may comprise identifying a modified data transfer request comprising a modification to the target communications connection of the data transfer request, determining, for the target communications connection of the modified data transfer request, bandwidth availability, between the source node and the destination node during a period that incorporates the target commencement time, generating, from the modified data transfer request and determined bandwidth availability, revised image data; and outputting an updated evaluation display on a display unit using the generated revised image data.

The method may comprise validating a data transfer request that has been evaluated to be viable, for example to enter the data transfer request into a planner from which the requested data transfer can be effected.

The evaluation display can be used in an Information Exchange Plan Visualization and Control view of an Information Exchange Planner/Manager. An Information Exchange Plan (IEP) can be created, and the Information Exchange Plan Visualization and Control view used for analysing and validating the plan. The Information Exchange Plan Visualization and Control view is usable directly to manipulate parameters, including transfer times, to facilitate optimum planning.

An IEP may consist of a set of data transfers between communication nodes at specified times. Communication nodes may be static ground stations, ground vehicles, UAVs, satellites etc. For example, an IEP may be to transmit an image taken by a UAV to a ground station HQ via a second UAV. The Information Exchange Plan Visualization and Control view provides a graphical representation of the available, planned, and actual bandwidth vs time for the IEP. Traditionally, this information would be entered and viewed in a tabular format. Displaying the data in graphical format, for processing and manipulating, enables relative differences between data points to be identified and understood more easily, and can be less challenging for persons with such conditions such as dyscalculia, or similar, to work with.

A data transfer evaluation system and method has been described that advantageously allows a planned information exchange to be viewed and modified from a graphical, rather than a tabular, based view. The view comprises a graph with bandwidth availability indicated on the Y-axis and time indicated on the X-axis. On the graph, data for each planned information exchange is plotted, and available bandwidth between nodes, planned information exchange start/finish times and bandwidth required, and actual (predicted) information exchange start/finish times and bandwidth required indicated. This makes it clear to see whether a planned information exchange is valid (viable/possible/achievable). In addition, times where data could be transmitted at a higher transfer rate or where more data could be transmitted, or where the start time for a planned information exchange needs to be moved so that it becomes valid, are easily discerned.

With the data transfer evaluation system and method, displaying available bandwidth with planned and actual (predicted) transfer times, and providing easy manipulation of planned transfer times, allows an operative to quickly assess, validate and modify a plan with confidence.

The invention claimed is:

1. A data transfer evaluation system for data transfer management, comprising:
- a memory and/or a user interface; and
- a processor, in electrical communication with the memory and/or the user interface, the processor is configured to:
  - generate a data transfer request, the data transfer request comprising data indicating:
    - a request for data to be transferred from a source node to a destination node;
    - a target communications connection for the data transfer;
    - a target transfer rate for the data transfer; and
    - a target commencement time for the data transfer;
  - determine, for the target communications connection, bandwidth availability, between the source node and the destination node during a period that incorporates the target commencement time;
  - generate, from the generated data transfer request and determined bandwidth availability, image data for a display to output an evaluation display comprising:
    - a graphical representation of the determined bandwidth availability; and
    - a visual representation of transmittal data, the transmittal data comprising the target transfer rate and a duration for an amount of data to be transferred at the target transfer rate;
  - the visual representation of transmittal data presented at a region of superimposition with the graphical representation of the determined bandwidth availability, based on the target commencement time, the region of superimposition providing a visual indication as to whether the data transfer request is viable.

2. A data transfer evaluation system as claimed in claim 1, wherein the processor is further configured to identify an input comprising a request to modify the target commencement time to a modified target commencement time and, in response, generate a data transfer request comprising data indicating the modified target commencement time as the target commencement time.

3. A data transfer evaluation system as claimed in claim 2, wherein the processor is further configured to generate image data for the evaluation display to present a graphical control element usable to input, to the processor, a request to modify the target commencement time to a modified target commencement time.

4. A data transfer evaluation system as claimed in claim 3, wherein the graphical control element usable is a portion of the visual representation of transmittal data.

5. A data transfer evaluation system as claimed in claim 1, wherein the processor is further configured to identify an input comprising a request to modify the target transfer rate to a modified target transfer rate and, in response, generate a data transfer request comprising data indicating the modified target transfer rate as the target transfer rate.

6. A data transfer evaluation system as claimed in claim 5, wherein the processor is further configured to generate image data for the evaluation display to present a graphical control element usable to input, to the processor, a request to modify the target transfer rate to a modified target transfer rate.

7. A data transfer evaluation system as claimed in claim 6, wherein the graphical control element is a portion of the visual representation of transmittal data.

8. A data transfer evaluation system as claimed in claim 1, wherein the processor is further configured to identify an input comprising a request to modify the target communications connection to a modified target communications connection and, in response, determine for the modified target communications connection, bandwidth availability, between the source node and the destination node during a period that incorporates the target commencement time.

9. A data transfer evaluation system as claimed in claim 1, wherein an input comprising a request to modify the target transfer rate to a modified target transfer rate is identified from a request to modify the target communications connection to a modified target communications connection.

10. A data transfer evaluation system as claimed in claim 1, wherein the source node and/or the destination node is one of: a ground station, a ground vehicle, a watercraft, an aircraft, an unmanned aerial vehicle (UAV), or a satellite.

11. A data transfer evaluation system as claimed in claim 1, wherein the target communications connection is a radio communication connection.

12. A data transfer evaluation system as claimed in claim 1, wherein the target commencement time is an operator-specified value indicating a date and time.

13. A data transfer evaluation system as claimed in claim 1, further comprising the display for outputting the evaluation display from image data generated by the processor.

14. A data transfer evaluation system as claimed in claim 1, further comprising the user interface for inputting operator-specified selections to the processor.

15. A method for data transfer management, comprising:

identifying a data transfer request, the data transfer request comprising data indicating:

a request for data to be transferred from a source node to a destination node;

a target communications connection for the data transfer;

a target transfer rate for the data transfer; and a target commencement time for the data transfer;

determining, for the target communications connection, bandwidth availability, between the source node and the destination node during a period that incorporates the target commencement time;

generating, from the identified data transfer request and determined bandwidth availability, image data for a display unit to output an evaluation display comprising:

a graphical representation of the determined bandwidth availability; and a visual representation of transmittal data, the transmittal data comprising the target transfer rate and a duration for an amount of data to be transferred at the target transfer rate;

the visual representation of transmittal data presented at a region of superimposition with the graphical representation of the determined bandwidth availability, based on the target commencement time, the region of superimposition providing a visual indication as to whether the data transfer request is viable, and outputting the evaluation display on a display unit using the generated image data.

16. A method as claimed in claim 15, wherein the source node and/or the destination node is one of: a ground station, a ground vehicle, a watercraft, an aircraft, an unmanned aerial vehicle (UAV), or a satellite.

17. A method as claimed in claim 15, wherein the target communications connection is a radio communication connection.

18. A method as claimed in claim 15, further comprising:

identifying a modified data transfer request comprising a modification to the target commencement time of the data transfer request;

generating, from the modified data transfer request and determined bandwidth availability, revised image data; and outputting an updated evaluation display on the display unit using the generated revised image data.

19. A method as claimed in claim 15, further comprising:

identifying a modified data transfer request comprising a modification to the target communications connection of the data transfer request;

determining, for the target communications connection of the modified data transfer request, bandwidth availability, between the source node and the destination node during a period that incorporates the target commencement time;

generating, from the modified data transfer request and determined bandwidth availability, revised image data; and outputting an updated evaluation display on the display unit using the generated revised image data.

* * * * *